United States Patent
Li

(10) Patent No.: US 9,723,126 B2
(45) Date of Patent: Aug. 1, 2017

(54) METHODS AND SYSTEMS FOR RECALLING SECOND PARTY INTERACTIONS WITH MOBILE DEVICES

(71) Applicant: eBay Inc., San Jose, CA (US)

(72) Inventor: Hao Li, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/252,551

(22) Filed: Aug. 31, 2016

(65) Prior Publication Data

US 2016/0373568 A1 Dec. 22, 2016

Related U.S. Application Data

(63) Continuation of application No. 14/484,157, filed on Sep. 11, 2014, now Pat. No. 9,456,070.

(51) Int. Cl.
| | | |
|---|---|---|
| *H04L 12/58* | (2006.01) | |
| *H04M 1/725* | (2006.01) | |
| *H04M 1/656* | (2006.01) | |
| *H04M 1/652* | (2006.01) | |
| *H04M 1/65* | (2006.01) | |
| *G06Q 50/00* | (2012.01) | |

(52) U.S. Cl.
CPC .......... *H04M 1/7255* (2013.01); *G06Q 50/01* (2013.01); *H04L 51/32* (2013.01); *H04M 1/651* (2013.01); *H04M 1/652* (2013.01); *H04M 1/656* (2013.01)

(58) Field of Classification Search
CPC ....... H04M 1/656; H04M 1/651; H04M 1/652
See application file for complete search history.

(56) References Cited

U.S. PATENT DOCUMENTS

| | | | | |
|---|---|---|---|---|
| 8,819,150 | B1* | 8/2014 | Osinga | G06Q 10/107 709/204 |
| 9,143,468 | B1* | 9/2015 | Cohen | H04L 51/32 |
| 2003/0039380 | A1* | 2/2003 | Sukegawa | G06K 9/6255 382/118 |
| 2004/0156616 | A1* | 8/2004 | Strub | G11B 27/031 386/224 |
| 2006/0225140 | A1 | 10/2006 | Mergenthaler | |

(Continued)

OTHER PUBLICATIONS

"U.S. Appl. No. 14/484,157, Final Office Action mailed Feb. 18, 2016", 14 pgs.

(Continued)

*Primary Examiner* — Erin File
(74) *Attorney, Agent, or Firm* — Schwegman Lundberg & Woessner, P.A.

(57) ABSTRACT

Systems and methods are presented for identifying individuals through facial recognition, voice recognition, or the like, recalling past recorded conversations with the identified individuals, and recording and inventorying conversations with the individuals with mobile devices. In some embodiments, a method is presented. The method may include identifying, at a device, an individual through facial recognition, voice recognition, or a unique RFID. The method may also include recording a conversation with the identified individual, and recalling past relevant recorded conversations based on the identification of the individual, and transmitting the recording of the conversation to a display system configured to display the recording of the event.

20 Claims, 9 Drawing Sheets

(56) References Cited

U.S. PATENT DOCUMENTS

| | | | |
|---|---|---|---|
| 2009/0030940 A1* | 1/2009 | Brezina | H04M 15/00 |
| 2009/0273682 A1* | 11/2009 | Shekarri | G01P 1/127 |
| | | | 348/207.1 |
| 2009/0276708 A1* | 11/2009 | Smith | G06Q 10/087 |
| | | | 715/716 |
| 2010/0183199 A1* | 7/2010 | Smith | G06F 19/322 |
| | | | 382/117 |
| 2011/0137884 A1* | 6/2011 | Anantharajan | G06F 17/30637 |
| | | | 707/708 |
| 2013/0282609 A1* | 10/2013 | Au | F16P 3/142 |
| | | | 705/325 |
| 2014/0198956 A1* | 7/2014 | Forutanpour | G06K 9/00295 |
| | | | 382/115 |
| 2014/0201231 A1* | 7/2014 | Smith | G06F 17/30864 |
| | | | 707/769 |
| 2015/0039308 A1* | 2/2015 | Kim | G06F 17/30752 |
| | | | 704/235 |
| 2015/0081299 A1* | 3/2015 | Jasinschi | A61B 5/165 |
| | | | 704/246 |
| 2015/0346932 A1 | 12/2015 | Nuthulapati | |
| 2016/0080538 A1 | 3/2016 | Li | |
| 2016/0357749 A1* | 12/2016 | Fan | G06F 17/3053 |

OTHER PUBLICATIONS

"U.S. Appl. No. 14/484,157, Non Final Office Action mailed Jul. 28, 2015", 12 pgs.

"U.S. Appl. No. 14/484,157, Notice of Allowance mailed May 31, 2016", 5 pgs.

"U.S. Appl. No. 14/484,157, Response filed May 18, 2016 to Final Office Action mailed Feb. 18, 2016", 15 pgs.

"U.S. Appl. No. 14/484,157, Response filed Nov. 25, 2015 to Non Final Office Action mailed Jul. 28, 2015", 13 pgs.

U.S. Appl. No. 14/484,157, filed Sep. 11, 2014, Methods and Systems for Recalling Second Party Interactions with Mobile Devices.

* cited by examiner

METHODS AND SYSTEMS FOR RECALLING SECOND PARTY INTERACTIONS WITH MOBILE DEVICES

RELATED APPLICATIONS

This application is a continuation of U.S. patent application Ser. No. 14/484,157, filed on Sep. 11, 2014, which application is incorporated herein by reference in its entirety.

TECHNICAL FIELD

The subject matter disclosed herein generally relates to technology in a social communication context. In some example embodiments, the present disclosures relate to systems and methods for identifying individuals through facial recognition, voice recognition, or the like, recalling past recorded conversations with the identified individuals, and recording conversations with the individuals with mobile devices.

BRIEF DESCRIPTION OF THE DRAWINGS

Some embodiments are illustrated by way of example and not limitation in the figures of the accompanying drawings.

DETAILED DESCRIPTION

Figure 1:
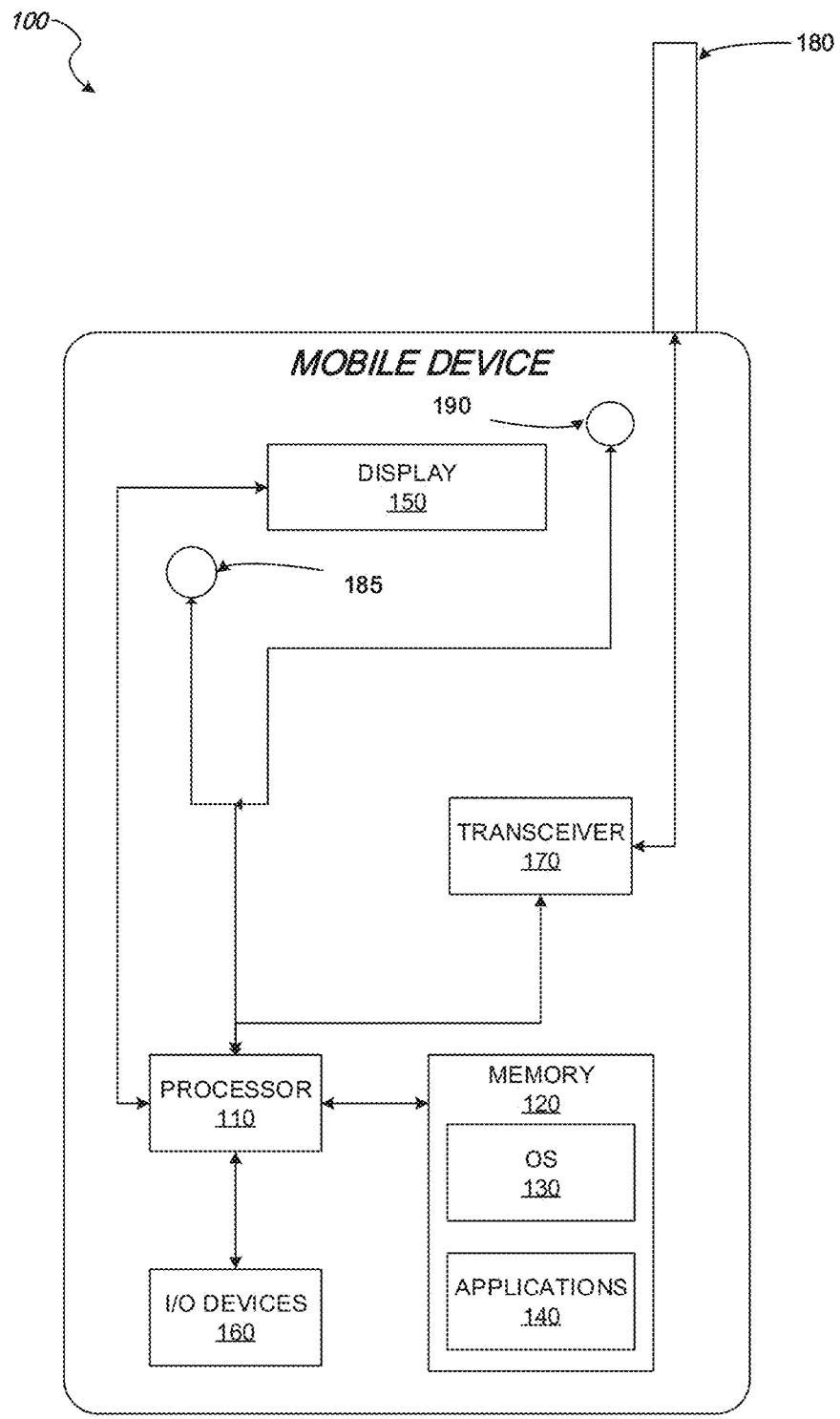
FIG. 1 is block diagram illustrating a mobile device suitable for recording conversations or events and recalling said conversations or events at a later time, according to some example embodiments.

Systems and methods for identifying an individual at a device, then recording, storing, and later recognizing that individual and recalling and replaying the recording of the conversation are discussed. In the following description, for purposes of explanation, numerous specific details are set forth in order to provide a thorough understanding of some embodiments of the present disclosure. It will be evident, however, to one skilled in the art that the present disclosure may be practiced without these specific details. The following detailed description includes reference to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments may be combined, and some embodiments may be utilized, or structural, logical and electrical changes may be made without departing from the scope of what is claimed. The following detailed description is, therefore, not to be taken in a limiting sense, and the scope is defined by the appending claims and their equivalents.

The uses and applications of technology have assimilated into our daily lives in ways we previously could not imagine. Beyond simply superficial additions, technology has become something that is ingrained in our day-to-day lives. Wearable devices, such as Google Glass®, offer the potential to further supplement human social interactions, and offer useful functionality which may enhance, and support human experiences. In many cases, the intent of functionality offered by wearable devices is to provide their user with information relevant at the instant. Enabling such functionality in existing devices tends to require explicit, non-intuitive commands, or cumbersome and inconvenient steps. This can make for an awkward exchange, and defeat the purpose of the functionality offered by the technology. In general, it is desirable to improve methods for supplementing normal social contexts with technology that seamlessly integrates into daily social and professional interactions.

Aspects of the present disclosure are presented for identifying, recording, inventorying, recalling, and replaying conversations or events with mobile devices. In an example scenario, a first individual controlling a mobile device may engage in a conversation with a second individual. In some example embodiments, the mobile device may identify the second individual by means of facial recognition, voice recognition, or unique Radio Frequency Identifiers (RFID). Upon identifying the individual, the mobile device may then automatically begin recording the conversation. At the conclusion of the conversation, the mobile device may then save the recorded conversation into a dashboard or repository for referencing at the end of the day, end of the conversation, or so forth. Should the first person encounter the second person again at a later time, the mobile device may then recall the previously recorded conversation, through the facial recognition, voice recognition, or unique RFID, and convey the conversation to the first individual such that he may be informed and aware of any relevant details he may have otherwise forgotten. The mobile device may then continue recording and storing conversations the first individual has with the second individual, thereby creating a repository to be referenced at any time. In this way, the recordings of the individual's conversations may be automatically preserved for future use, without the individual needing to disrupt his or her natural involvement in the engagement through the use of non-intuitive commands or steps, to explicitly activate and inventory a recording by the mobile device.

Referring to FIG. 1, a block diagram illustrating a mobile device 100 is presented, according to some example embodiments. The mobile device 100 may be configured to detect or identify identifying features of an individual, according to at least some example embodiments. The mobile device 100 may be configured to record a conversation or event with the individual. Examples of identifying features may include facial features, voice, a unique RFID, barcode, an individual's name, and the like. Microphone 185 and image recorder 190 may be configured to record various audio recordings and video recordings, respectively. In some cases, the microphone 185 and image recorder 190 may be included into a single component of mobile device 100, such as an audio/visual (AV) recorder known to those with skill in the art. An application 140 running on the mobile device 100 may be configured to instruct microphone 185 and/or image recorder 190 to automatically record a conversation or event associated with the identified individual. The recorded conversation or event may be transmitted or stored in a repository for later viewing by the user of the mobile device 100. The data of the audio and video recordings may be processed by processor 110. The processor 110 may be any of a variety of different types of commercially available processors suitable for mobile devices 100 (e.g., an XScale architecture microprocessor, a Microprocessor without Interlocked Pipeline Stages (MIPS) architecture processor, or another type of processor). The processor 110 may be configured to operate applications 140 like the one mentioned above and identify an individual through facial recognition, voice recognition, or a unique RFID. A memory 120, such as a random access memory (RAM), a Flash memory, or other type of memory, is typically accessible to the processor 110. The memory 120 may be adapted to store an operating system (OS) 130, as well as application programs 140, such as a mobile application for recording a conversation or event based on the identified natural gesture or natural phrase. The processor 110 may be coupled, either directly or via appropriate intermediary hardware, to a display 150 and to one or more input/output (I/O) devices 160, such as a keypad, a touch panel sensor, a microphone, a controller, a camera, and the like. Similarly, in some embodiments, the processor 110 may be coupled to a transceiver 170 that interfaces with an antenna 180. The transceiver 170 may be configured to both transmit and receive cellular network signals, wireless data signals, or other types of signals via the antenna 180, depending on the nature of the mobile device 100. In this manner, a connection with a third party network such as network 450 of FIG. 4, discussed more below, may be established.

Figure 2:
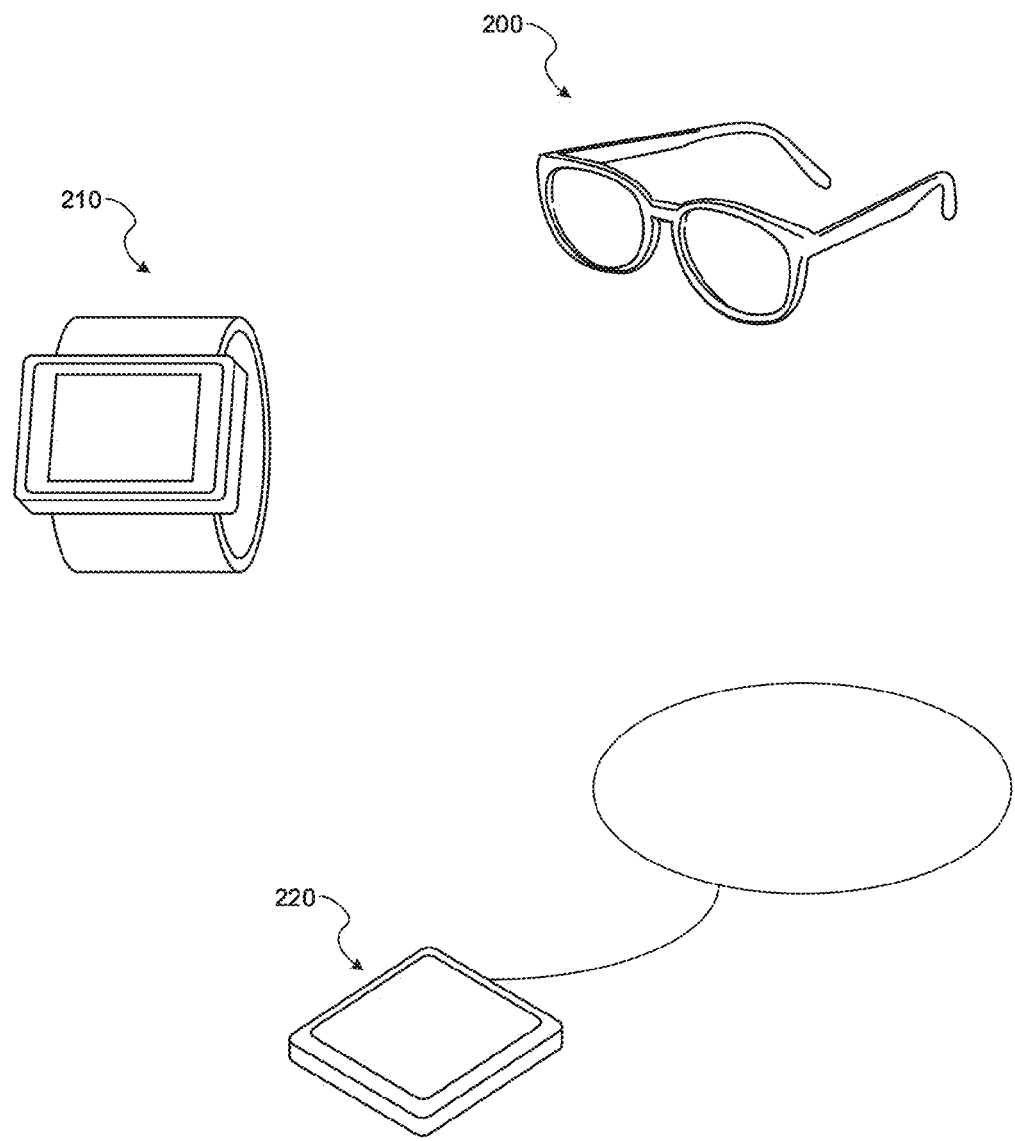
FIG. 2 is a set of images of various wearable devices suitable for recording conversations or events and recalling said conversations or events at a later time, according to some example embodiments.

Referring to FIG. 2, other examples of mobile devices that can be used in aspects of the present disclosure are presented. The devices presented in FIG. 2 may be wearable devices that are configured to identify the first or second individual, according to some example embodiments. For example, glasses 200 may be specially equipped with micro viewing technology, one or more microphones, one or more micro cameras, and one or more microprocessors that collectively may be capable of identifying the first or second individual in proximity to a user who is wearing glasses 200, and recording events or conversations including those identifying features. Glasses 200 may be similar to wearable digital devices such as Google Glass®, and other glasses with digital technology. As another example, smart watch 210 may also be specially equipped with one or more microphones, one or more cameras, and one or more microprocessors that collectively may be capable of identifying individuals in proximity to a user wearing smart watch 210, and recording events or conversations including those gestures or phrases. As another example, wearable device 220 may be a digital device wearable around the user's neck. The device 220 may possess similar functionality as those described in glasses 200 or smart watch 210. Other example wearable devices can include a Fitbit® and a mobile device attached to a shoulder strap. In some example embodiments, a combination of devices can be configured to facilitate aspects of the present disclosure. For example, a first wearable device can be configured to identify an individual in proximity with the wearer of the device, while a second wearable device can be configured to record conversations or events including the identifying features based on the identification from the first wearable device. The two devices could be communicatively coupled via Bluetooth® or other means apparent to those with skill in the art. In general, other wearable devices apparent to those with skill in the art and consistent with the disclosures herein may also be capable of performing the functions according to aspects of the present disclosure, and embodiments are not so limited.

Figure 3:
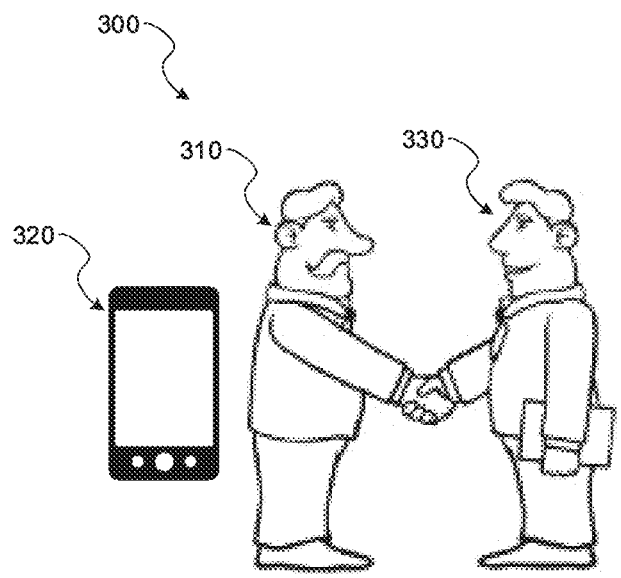
FIG. 3 is an example scenario for identifying an individual, and recording a conversation with that individual with a mobile device, according to some example embodiments.

Referring to FIG. 3, an example scenario 300 utilizing aspects of the present disclosure is presented. Here, scenario 300 depicts two individuals, a first individual 310 in control of mobile device 320, and a second individual 330. The mobile device 320 may be consistent with mobile device 100, or any of wearable devices 200, 210, or 220. In this example, individual 330 may have just approached individual 310 to have a conversation. Individual 310 may desire to be reminded of what his last conversation with individual 330 pertained to, or may simply desire to record or preserve his conversation with individual 330 without disrupting the flow of the conversation though any interruption to activate a recording device, or access notes. In some cases, individual 310 may desire to simply record and preserve conversations in a repository as a form of keeping notes, or as reminders. Here, mobile device 320 would be of assistance to individual 310 in this exchange by first being configured to identify an individual in proximity with individual 310. In some cases, mobile device 320 may be equipped with either: image recognition software and a camera capable of utilizing the image recognition software; or speech recognition software, and a microphone capable of utilizing the speech recognition software. Certain key features about individual 330 may be programmed or taught to mobile device 320, by learning to identify individual 330's facial features or voice. As another example, individual 310 may desire to record or preserve parts of a conversation related to a certain subject matter and may have preprogrammed device 320 to listen for and identify certain key words or phrases related to the key words or phrases.

Once mobile device 320 has identified an individual, mobile device 320 may automatically start recording audio, video, or both simultaneously. Mobile device 320 may therefore capture the conversation. In some example embodiments, the recording may end after individual 330 has left the proximity of individual 310. In other example embodiments, mobile device 320 may begin passively recording audio and/or video in a rolling buffer once an individual has been detected in the proximity of individual 310, but before that individual has been identified. Mobile device 320 may only store parts of the recording once an individual has been identified through identifying features, in proximity of individual 310. For example, while passively recording, mobile device 320 may detect an individual 330 in proximity with individual 310. In some cases, mobile device 330 may only store the audio and/or video recordings after detecting and identifying individual 330 within proximity of individual 310. Mobile device 320 may then either identify that the individual is individual 330 (an individual who individual 310 has previously encountered), or a new individual 340, who individual 310 has not encountered yet, with identifiable features which may be preserved for future identification. In this way, a more complete context of the conversation may be captured.

The stored recordings of conversations, automatically recorded by mobile device 320, may be saved and/or transmitted to a repository configured to allow quick and easy access for viewing by the user and uploading to other social media by the user. In some example embodiments, mobile device 320 may recall, and present to individual 310, notes or complete recordings of prior relevant conversations with an individual, such as individual 330, upon identifying individual 330 in proximity of individual 310, through identification of individual 330's facial features, voice, or unique RFID. For example, upon identifying individual 330 in proximity with individual 310, mobile device 320 may be configured to convey a brief summary containing the key topic of conversation from individual 310's last encounter with individual 330. The summary may be conveyed to individual 310 in the form of a short audio presentation, or a transcription of key words from the conversation in text, or a short video or photo of individual 310's last conversation with individual 330. The key topic of conversation may be determined by frequency of use of a particular word or phrase, or any other means which a person of skill in the art would utilize to determine the key topic of conversation. In another embodiment, individual 310 may manually choose certain key words, phrases, or other criteria, such as the date when the last conversation occurred. Mobile device 320 may then convey the requested information to individual 310 in an order of most to least relevant, determined by the search criteria.

In another example, individual 310 may configure mobile device 320 to remind him of some specific past topic of conversation upon recognizing that individual 330 is in his proximity. For example, individual 310 may manually set an alert, either through an intuitive voice command, or through a series of steps to be carried out on mobile device 320, which may recall a particular fact or piece of information which will be presented to individual 310 when mobile device 320 identifies individual 330 in the proximity of individual 310. In yet another possible embodiment, an alert may be automatically set by mobile device 320 by accessing individual 310's mobile calendar, or to-do list. Mobile device 320 may be configured to recall past relevant recordings of conversations with identifiable individuals, upon the identification of those individuals. In another example embodiment, mobile device 320 could be configured to actively recall any relevant topics of past conversation stored within the repository, as individual 310 and individual 330 are engaged in discussion, and convey relevant pieces to individual 310, based on key words recognized during the conversation. In yet another example embodiment, mobile device 320 could be configured to actively recall, not only its own recorded past conversations, but may also conduct a real time search of individual's personal email, social media accounts, or relevant websites. In this way, individual 310 may be constantly informed and reminded of relevant information, real time. An example repository will be described in further detail, below.

Thus, individual 310 can wear or carry mobile device 320, engage in his interactions with individual 330, while mobile device 320 can identify individual 330, record the conversation, recall relevant information during the conversation, and store the recorded conversation in a repository for future reference. In this way, individual 310 can focus all of his attention on individual 330, as well as engage in natural conversation with individual 330 without having to interrupt his interactions in order to activate mobile device 320. Individual 310 may simply go about his day and interact with whomever he encounters without needing to be mindful of activating mobile device 320 to capture particular moments of his interaction.

In some example embodiments, mobile device 320 may be a wearable device, such as any of wearable devices 200, 210, or 220. For example, if individual 310 was wearing mobile device 320 as a pair of glasses 200, mobile device 320 may be oriented to have one or more cameras directed to capture the field of view of individual 310, and thus may be in a suitable position to identify any individuals in the proximity of individual 310. As another example, if individual 310 was wearing mobile device 320 as a pendant or necklace, as might be the case with wearable device 220, mobile device 320 may also be oriented to capture audio video directly in front of individual 310.

Figure 4:
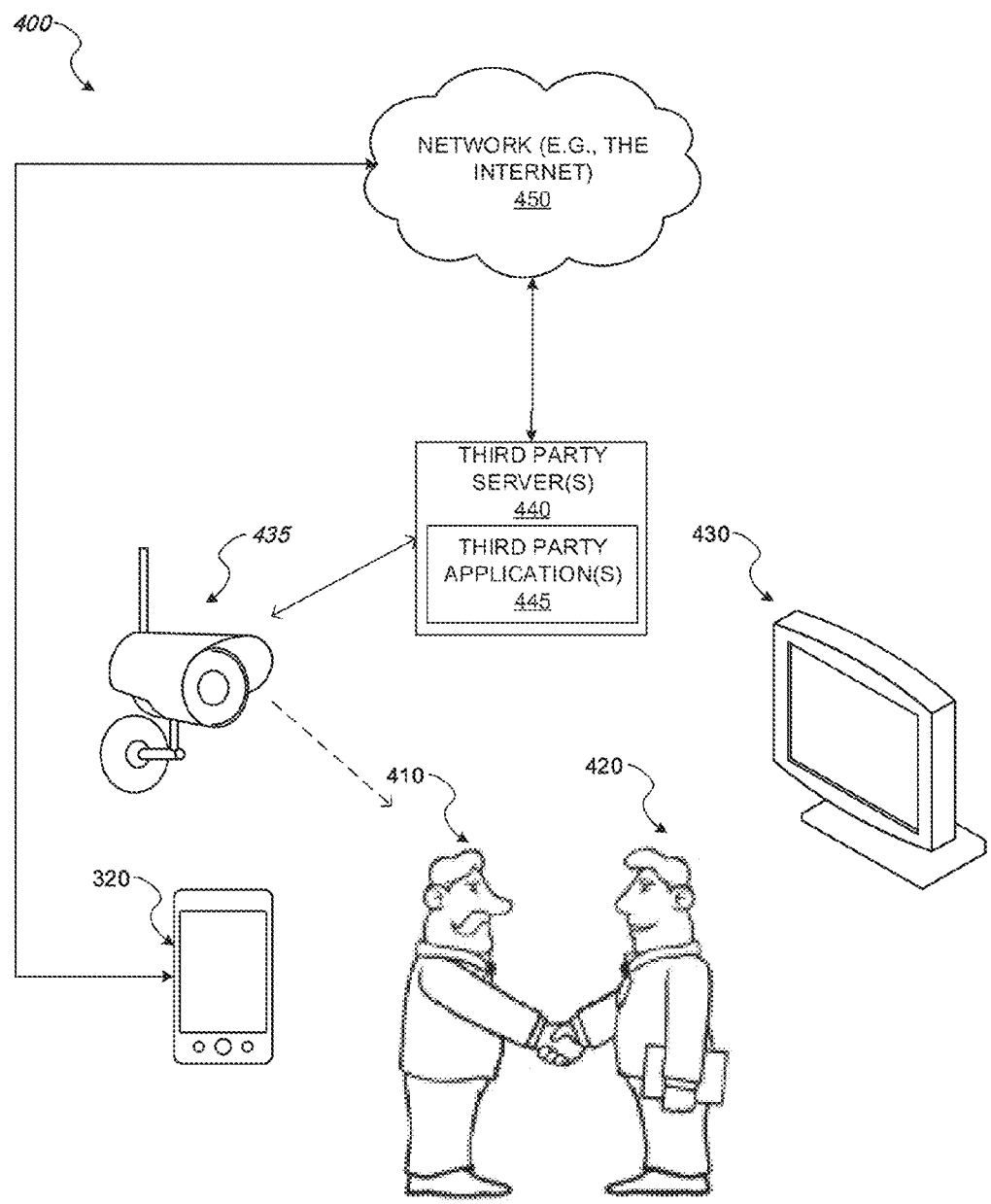
FIG. 4 is an example scenario for identifying an individual, recording a conversation with the individual, and replaying the recorded conversation through a third party device, according to some example embodiments.

Referring to FIG. 4, example scenario 400 is presented, illustrating a more complex system for replaying conversations recorded on mobile device 320, according to some example embodiments. In this example, individuals 410 and 420 are both present in a room with an audio/video display. Individual 410 may have in her possession a mobile device 320, which may be consistent with having the capabilities of mobile device 320 described in FIG. 3. Thus, mobile device 320 may be capable of identifying individuals, recording conversations, and recalling relevant recordings, just as in FIG. 3. However, additional functionality according to aspects of the present disclosure may also be possible due to a third-party system surrounding individuals 410 and 420. For example, audio/video display 430 may be mounted or positioned in the place where individuals 410 and 420 are present. Mobile device 320 may be configured to transmit recorded conversations from the repository, onto audio/video display 430 for the purposes of viewing by individuals 410 and 420. In some embodiments, there may be only one audio/video display 430, and in other cases there may be more than two audio/video displays 430. Audio/video display 430 may be a part of a third-party network, in the sense that the third-party system or network is not controlled or owned by either of individuals 410 or 420. In some example embodiments, audio/video display 430 could also be another mobile device controlled by another individual who may also be present in the room with individuals 410 and 420. For clarity, individual 410 may be considered a first-person entity since she is in control of mobile device 320, while individual 420 may be considered a second-person entity, due to interacting with individual 410 and not having control of mobile device 320. The third-party audio/video display 430 may receive and replay recorded conversations from mobile device 320 for viewing by all parties present in the room.

In some example embodiment, third party audio/video display 430 may also have recording capability itself. For example, individuals 410 and 420 may be in a meeting room with several other individuals, where it may be difficult for mobile device 320 to effectively identify everyone in the room or record the entirety of the conversation. Audio/video display 430 may also include a camera or recording device 435, either incorporated into audio/video display 430, or connected otherwise wirelessly or with wires. Once mobile device 320 is configured to replay recorded conversations through audio/video display 430, mobile device 320 may receive video and audio from audio/video device 430 in order to identify the individuals present in the room, and record the conversation which takes place in the meeting room to the repository in mobile device 320. In this way, mobile device 320 may be configured to receive audio/video signals from audio/video display 430, to allow for a more detailed and complete recording of the meeting which transpired.

In some example embodiments, a third party server 440 may include third party application 445, with the third party server 440 connected to audio/video display 430. The third party application may be configured to control audio/video display 430 to perform the functions described herein. The audio/video display 430 may be connected wirelessly or via wires to third party server 440. In some example embodiments, the recorded events or moments including the identified natural gesture or phrase may be transmitted from device 320 and saved in third party server 440. In other cases, audio/video display 430 may be capable of functioning independently of third party application 445.

In some example embodiments, third party server 440 may be connected to a network 450, such as the Internet. Through the network 450, the recordings of the conversations captured by mobile device 320 may be transmitted to a central repository viewable by individual 410. The third-party system may be able to direct the stored conversation or event to a repository controlled by individual 410 based on an application platform capable of sharing base configurations. For example, individual 410 can pre-configure the sharing settings on an application platform associated with the repository. The application platform can also allow sharing of conversations or events between individuals or devices recording conversations or events.

In some example embodiments, the conversations recorded by mobile device 320 may be transmitted directly to audio/video display 430. The recorded conversations may be transmitted through network 450 via third party server 440.

Figure 5:
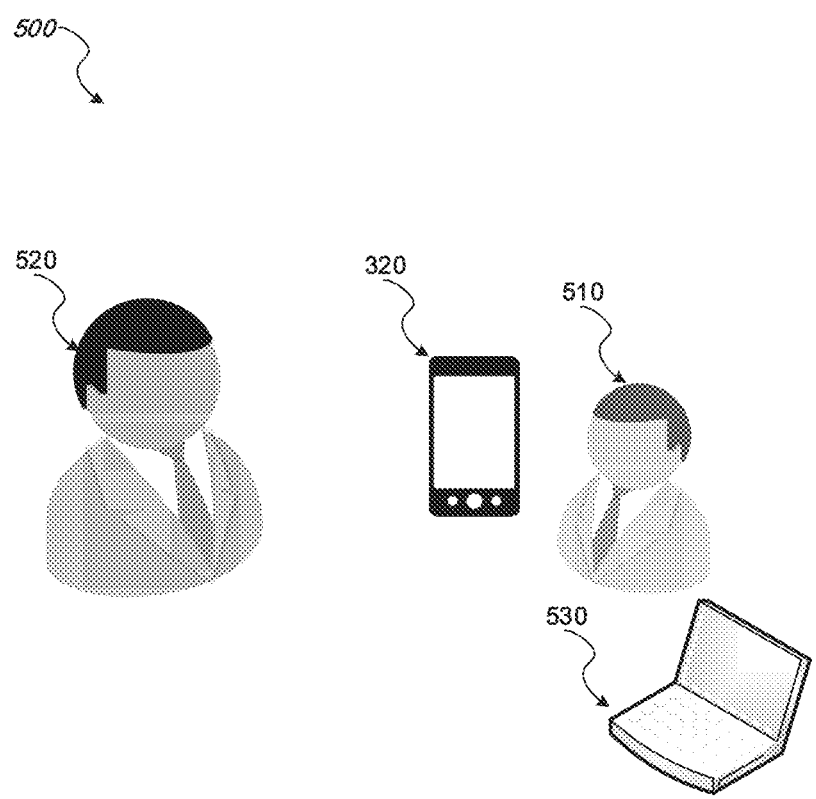
FIG. 5 is another example scenario for identifying an individual, recording a conversation with that individual, and transmitting the conversation to a third party device, where it may later be referenced, according to some example embodiments.

Referring to FIG. 5, example scenario 500 is presented, illustrating another variant for storing and replaying recorded conversations based on identified or detected individuals in proximity with an individual with the described mobile device 320, according to some example embodiments. In this example, individuals 510 and 520 are in a classroom where individual 510 is diligently taking notes which his professor, individual 520 dictates. Individual 510 may have in his possession and be in control of mobile device 320, which may operate in the same or similar manner as described in FIG. 3 and FIG. 4. In addition, the third party system described in FIG. 4 may also be present to automatically save recorded conversations in another designated location, between individuals 510 and 520. Individual 510 may choose to review the recorded conversations as audio or text to be displayed on a personal computer 530. For example, mobile device 320 may be configured such that individual 510 may designate that individual 520 is his professor, and that all recorded conversations of individual 520 should be sent directly to a folder in his personal computer containing class notes relevant to individual 520's course. In addition, mobile device 320 may also be configured to conduct a search of the repository of recorded conversations, for key words, phrases, or subjects which are topically relevant to the subject matter of individual 520's lecture, and include those search results in the presented information. In this way, mobile device 320 may present recordings of past conversations or lectures with individual 520 which are relevant to the current lecture. Individual 510 may then attend class and supplement his own notes with the recordings created by mobile device 320. In another embodiment, mobile device 320 may transcribe the audio into text before transmitting audio, text, or both to personal computer 530.

Figure 6:
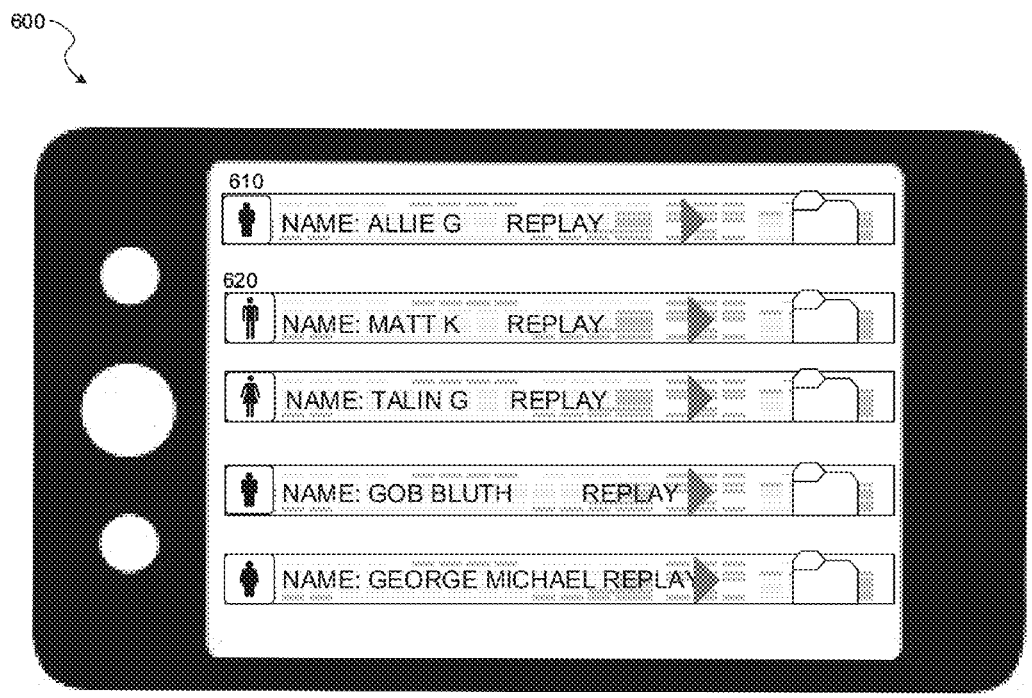
FIG. 6 is an example embodiment of a repository for storing and displaying recordings of conversations.

Referring to FIG. 6, example dashboard 600 illustrates an example form of a repository for receiving and storing the conversations and identifying features, recorded and identified by the present disclosure. Here, an example list of recorded conversations associated with an individual 610 and another individual 620 were received and stored in dashboard 600. The dashboard 600 could be configured to conveniently and quickly upload any of the stored events to various social media websites or blogs. The dashboard 600 may allow for preconfigured settings to enable easier access to the social media websites or blogs, such as username accounts and passwords, as well as specifications as to what kinds of social media the user has access to. Thus, at the end of the day, or the end of an event, a user can quickly and conveniently access the dashboard 600, view what kinds of recordings were captured automatically by aspects of the present disclosure, and then access any desired recordings to be shared by searching. For example, upon searching for and selecting a number of recordings, the user may choose to place the recordings, as well as their transcriptions into a document to be emailed to a group of people. Alternatively, the user may choose to select bits and pieces of multiple recordings and create a single compilation of events, to be shared through the social media of his choosing. In addition, a user can select their own search criteria which may then order the results, and present them to the user in the most desirable way. For example, should the user decide that he would like all results recorded within the last two months related to a particular topic to be displayed from most recent to least recent, or alternatively, most relevant to the particular topic to less relevant to a particular topic. In this way, the user may select their own ordering criteria for the search results to more easily and efficiently search the repository.

As another example, a journalist may be tasked with researching a story to be featured on the news. The journalist may visit numerous leads and people to be interviewed for the piece. The journalist may be engaged with meeting a business owner, along with his employees, and patrons of his business. The journalist may carry or wear a mobile device, like mobile device 100, 200, 210, 220, or 320, configured to perform various methods according to aspects of the present disclosure, including automatically identifying individuals within proximity of the device and recording conversations. Thus, while the journalist conducts her interviews with individuals she encounters, her mobile device can automatically identify the individuals, recall relevant information which would be useful to her interview, record the entirety of the interview, and store the recorded interview in a repository for future viewing. Then, at the end of the day, the journalist can go through all of the recorded conversations with everyone she may have interviewed via the repository, an example display of which is shown in FIG. 6. The journalist can then select which interviews or selections from interviews she thinks are particularly noteworthy, and upload those preferred recordings to a blog, social media page, or her personal computer so she may distribute them to her colleagues as she chooses.

In general, while in some example embodiments, previous conversations or notes may be recalled upon automatically recognizing an individual associated with the previous conversation or notes, in other cases, a user may manually recall recorded conversations or events for playback associated with an individual, independent of whether that individual is in near proximity to the user. For example, in preparation for a business meeting, the user may wish to recall notes from a previous meeting 15 minutes prior to attending the meeting. The user may recall one or more previous meeting records based on the meeting records being associated with an identified person common to the meetings, or in other cases, a group of identified people common to the meetings. The user can then review the meeting notes before engaging with those same individuals in the current meeting.

Figure 7:
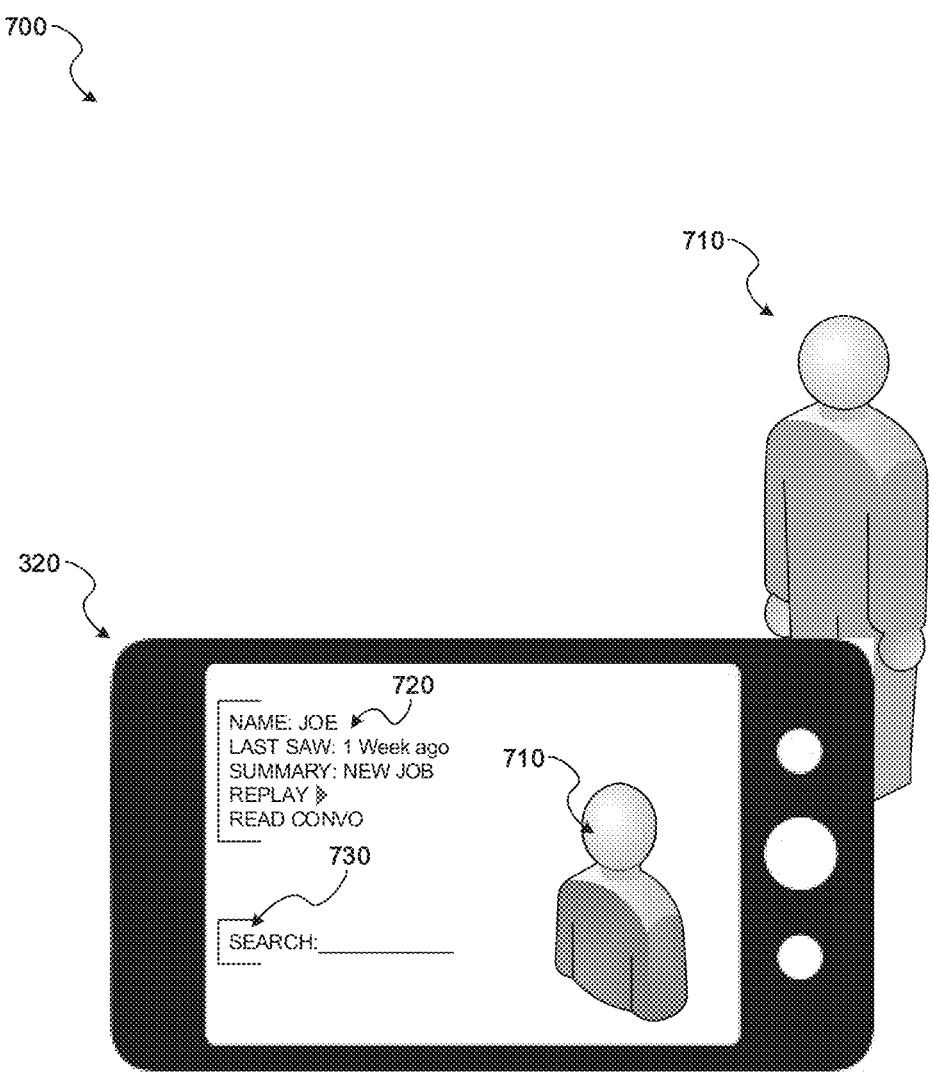
FIG. 7 is an example scenario for identifying an individual and displaying relevant information related to that individual, based on automatic recognition, with a mobile device.

Referring to FIG. 7, example scenario 700 is presented according to some example embodiments, illustrating an example of the identification and recall features as an individual using the device described may experience. In this example, individual 710 is in proximity with mobile device 320. In the display of mobile device 320, an image of individual 710 is presented to the user of the device, with details associated with his identification by mobile device 320 superimposed adjacent to the image of individual 710, in readout 720. Readout 720 may include information related to individual 710, such as his name or identifier, details regarding the last time individual 710 was last in proximity of mobile device 320, a summary related to the topic of the last encounter, or recordings of past conversations related to automatically or manually determined search criteria. This information may be populated automatically through mobile device 320, or entered manually by a user of mobile device 320. For example, on a first encounter, if little is known about an individual in proximity with mobile device 320, mobile device 320 may be configured to automatically search through the recorded conversation and populate relevant fields of the readout 720, such as individual 710's name. In another embodiment, mobile device 320 may also give its user the option to search through the content of the recordings of conversations with individual 710 by manually searching through search field 730 by key word or search criteria. For example, an individual using mobile device 320 may wish to search through all the recordings of conversations with individual 710 stored within mobile device 320's repository within a two week span.

Figure 8:
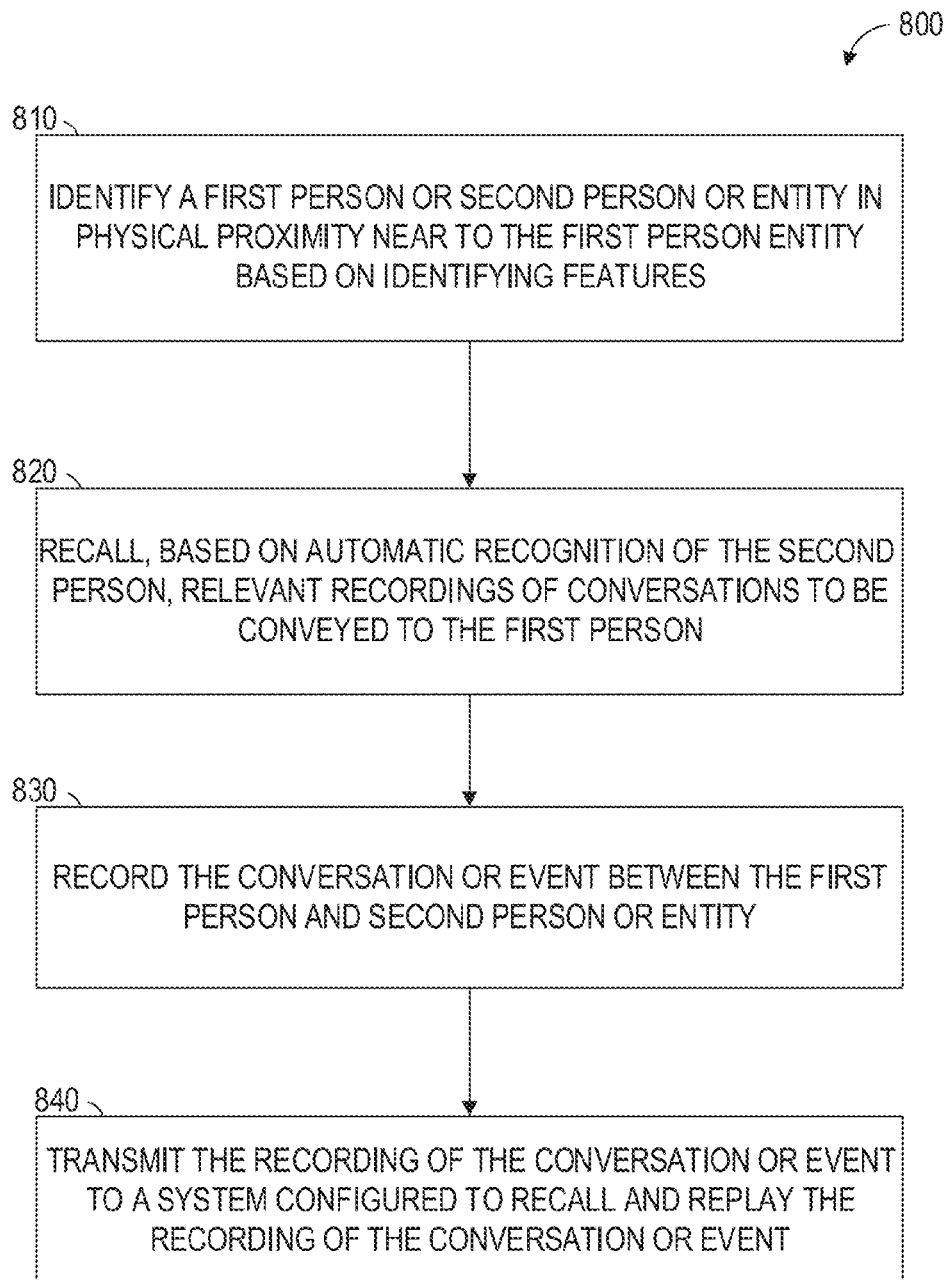
FIG. 8 is a flowchart illustrating example operations for: identifying an individual; recalling, based on automatic recognition, relevant recordings of conversations with that individual: recording the conversation with the individual; and transmitting the recording to a system configured to replay the recording of the conversation with a mobile device, according to some example embodiments.

Referring to FIG. 8, the flowchart illustrates an example methodology 800 for identifying individuals, recalling relevant recorded conversations, and recording and storing conversations with a mobile device, according to aspects of the present disclosure. The example methodology may be consistent with the methods described herein, including, for example, the descriptions in FIGS. 1, 2, 3, 4, 5, 6, and 7.

At block 810, a device may identify a first or second individual in physical proximity with the first individual. The device may be a mobile device associated with the first individual, which may be similar to mobile devices 100, 200, 210, 220 or 320. In other cases, the device may be associated with a third party system separate from both the first individual and the second individual, such as through the use of an audio/video display 430 with recording capability. The device may be configured to identify an individual through various facial recognition, voice recognition, unique RFID, barcode, or other similar means apparent to those with skill in the art. The device may be taught or programmed to recognize particular individuals, or particular words or phrases used in ordinary language.

At block 820, the device may recall past relevant recorded conversations or outside information based on the second individual recognized in block 810, and conveys the information to the first individual. In some cases, this can be done by displaying key words or phrases as a form of a reminder to the first individual, or alternatively as a complete recording or text document. In some embodiments this step may be carried out at the device, or alternatively may be accomplished by a backend processor.

At block 830, the device may record a conversation with the identified second individual. In some cases, the recording may end after the second individual has left the proximity of the first individual. In other example embodiments, the device may begin passively recording audio and/or video in a rolling buffer once an individual has been detected in the proximity of the first individual, but before the individual has been identified. The device may only store parts of the recording once an individual has been identified in proximity of individual. For example, while passively recording, mobile device may detect an individual in proximity with individual. Mobile device may then store the audio and/or video recordings after detecting and identifying the second individual within proximity of the first individual. The device may then determine whether the individual is a previously identified individual, or a new individual, who the first individual has not encountered yet, with identifiable features which may be preserved for future identification. In general, block 830 may be consistent with the various descriptions herein, including the descriptions in FIGS. 3, 4, and 5.

At block 840, the device may transmit the recording of the conversation to a display system configured to display the recording of the conversation. In some cases, the display system may be a part of the device. In other cases, the display system may be a repository, such as a dashboard consistent with the descriptions of FIG. 6. The device may include a transmitter configured to access and transmit the recorded event.

Figure 9:
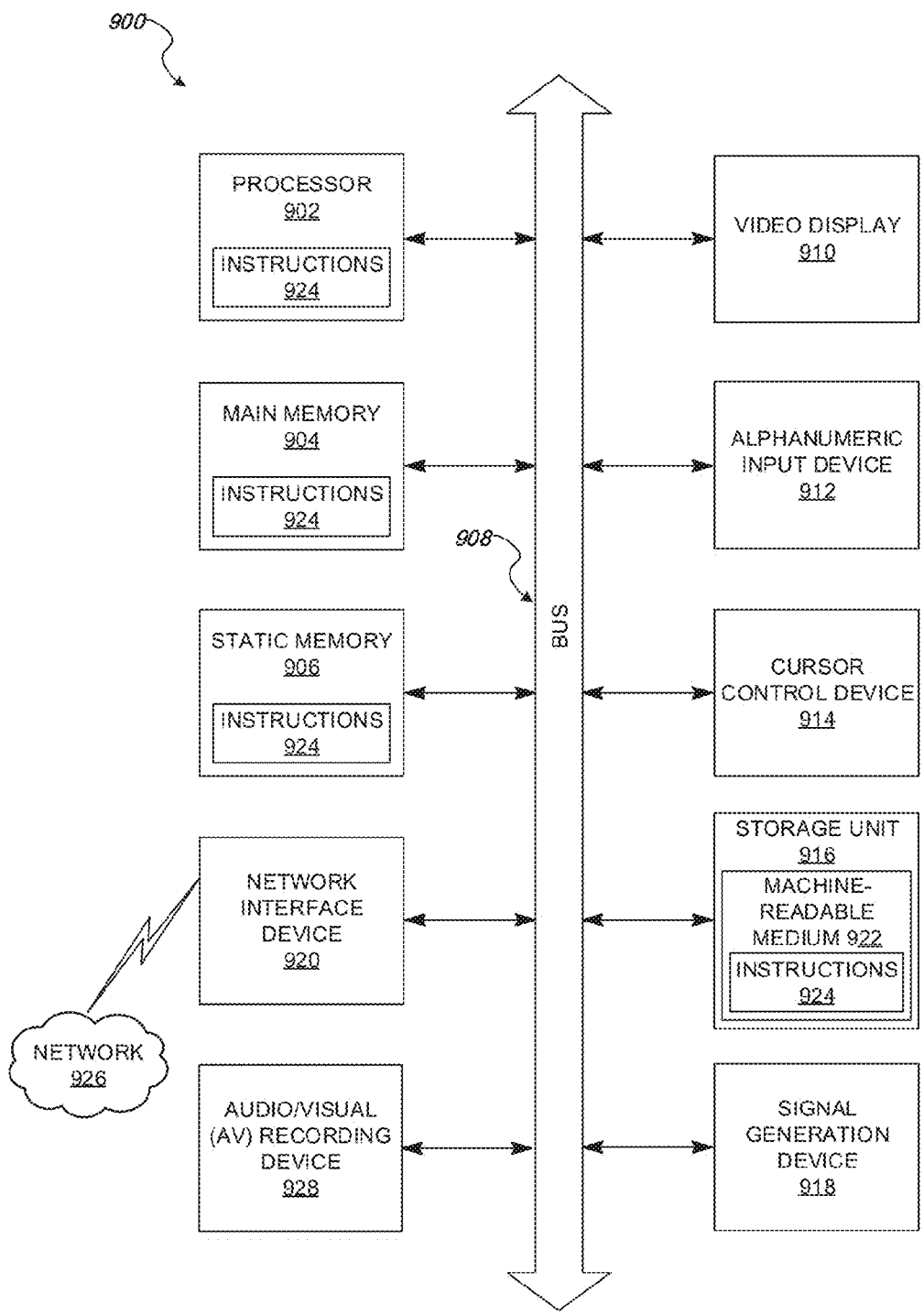
FIG. 9 is a block diagram illustrating components of a machine, according to some example embodiments, able to read instructions from a machine-readable medium and perform any one or more of the methodologies discussed herein.

Referring to FIG. 9, the block diagram illustrates components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application 140, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may include hardware, software, or combinations thereof, and may as examples be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine 900 is illustrated, the term "machine" shall also be taken to include any collection of machines 900 that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924, such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include an audio/visual recording device 928, suitable for recording audio and/or video. The machine 900 may further include a video display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, a signal generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein, including, for example, any of the descriptions of FIGS. 1, 2, 3, 4, 5, 6, and/or 7. The instructions 924 may also reside, completely or at least partially, within the main memory 904, within the processor 902 (e.g., within the processor's cache memory), or both, before or during execution thereof by the machine 900. The instructions may also reside in the static memory 906.

Accordingly, the main memory 904 and the processor 902 may be considered machine-readable media 922 (e.g., tangible and non-transitory machine-readable media). The instructions 924 may be transmitted or received over a network 926 via the network interface device 920. For example, the network interface device 920 may communicate the instructions 924 using any one or more transfer protocols (e.g., Hypertext Transfer Protocol (HTTP)). The machine 900 may also represent example means for performing any of the functions described herein, including the processes described in FIGS. 1, 2, 3, 4, 5, 6, and/or 7.

In some example embodiments, the machine 900 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 922 able to store data temporarily or permanently and may be taken to include, but not be limited to, RAM, read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions 924. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 922 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 902) may be configured by software (e.g., an application 140 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 902 or other programmable processor 902. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 902 configured by software to become a special-purpose processor, the general-purpose processor 902 may be configured as respectively different special-purpose processors (e.g., comprising different hardware modules) at different times. Software (e.g., a software module) may accordingly configure one or more processors 902, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions described herein. As used herein, "processor-implemented module" refers to a hardware module implemented using one or more processors 902.

Similarly, the methods described herein may be at least partially processor-implemented, with a processor 902 being an example of hardware. For example, at least some of the operations of a method may be performed by one or more processors 902 or processor-implemented modules. As used herein, "processor-implemented module" refers to a hardware module in which the hardware includes one or more processors 902. Moreover, the one or more processors 902 may also operate to support performance of the relevant operations in a "cloud computing" environment or as a "software as a service" (SaaS). For example, at least some of the operations may be performed by a group of computers (as examples of machines 900 including processors), with these operations being accessible via a network 926 (e.g., the Internet) and via one or more appropriate interfaces (e.g., an application program interface (API)).

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 900. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 900 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media 922, and systems (e.g., apparatus) discussed herein:

1. A computer implemented method comprising:
identifying, in a first encounter, at a device, a first person, or a second person or entity in physical proximity with the first person;
recording, at the device, a conversation or event of the first encounter with the identified first person, or the second person or entity;
transmitting the recording of the conversation or event to a memory repository configured to replay the conversation;
automatically recognizing, in a second encounter, at the device, the first person, or the second person or entity;
recalling based on the automatic recognizing, at the device, the recorded conversation or event of the first encounter with the first person or second person or entity; and
conveying, at the device, the recorded conversation or event to the first person.

2. The method of description 1, wherein the device organizes data associated with the second person or entity, based on identifying features;
wherein the identifying features include facial features, voice, RFID, barcode, or fingerprint.

3. The method of description 1, wherein the device includes a third party device controlled by a third party that is separate from both the first person and the second person or entity;
wherein the third party device replays the recording of the conversation or event from the first person device.

4. The method of description 1, wherein the device conveys the recording of the conversation or event to the first person through text.

5. The method of description 1, wherein the device recalls additional past conversations with the recognized first person or second person or entity based on the automatic recognizing of the first person or the second person;
wherein the recordings are recalled based on the conversations or events that are most topically relevant to a most recent conversation or event with the first person, or the second person or entity.

6. The method of description 5, further comprising generating an ordering of the recorded conversation or event from most to least relevant, at the device, based on an ordering criterion;
conveying the recording or event of conversations in an order based on the ordering criterion.

The method of description 1, further comprising sharing the recordings of the conversation or event with the second person or entity;
wherein the conversation or event is shared through email, social media, or mobile messaging.

7. An apparatus comprising an input interface, an output interface, and at least one processor configured to perform any of the descriptions in descriptions 1 through 6.

8. A computer-readable medium embodying instructions that, when executed by a processor, perform operations comprising any of the descriptions in descriptions 1 through 6.

9. An apparatus comprising means for performing any of the descriptions in descriptions 1 through 6.

What is claimed is:

1. A method comprising:
detecting a Radio Frequency Identifier (RFID) of a first person in proximity with a device of a second person;
identifying the first person based on identifying features of the first person, the identifying features including a voice of the first person and the RFID of the first person;
retrieving a previous recorded conversation between the second person and the first person in response to the identifying the first person;
identifying a key word within the previous recorded conversation, the identifying the key word based on a frequency of the key word in the previous recorded conversation;
passively recording a conversation between the first person and the second person to a rolling buffer;
identifying the key word in the conversation between the first person and the second person;
recording the conversation to a memory repository in real time in response to identifying the key word; and
sharing the recording of the conversation with the second person.

2. The method of claim 1, wherein the identifying features include one or more facial features, voice data, a radio frequency identifier (RFID), a barcode, or a fingerprint.

3. The method of claim 1, wherein the method further comprises:
transmitting the conversation to a third party device controlled by a third party that is separate from both the first person and the second person.

4. The method of claim 1, wherein the method further comprises conveying the conversation to the second person.

5. The method of claim 4, wherein the conveying the conversation to the second person includes:
transcribing the conversation into text; and
causing display of the text at the device of the second person.

6. The method of claim 1, wherein the method further comprises:
recalling a past conversation between the first person and the second person in response to the identifying the first person based on the identifying features, the past conversation having occurred previously to the detecting the first person in proximity with the device of the second person; and
conveying the past conversation to the second person.

7. The method of claim 6, wherein the recalling the past conversation between the first person and the second person includes:
identifying the past conversation among a set of past conversations based on the identifying the first person and the identifying the key word, wherein the past conversation includes the key word.

8. The method of claim 1, wherein the method further comprises sharing the conversation with the first person, wherein the sharing the conversation includes:
detecting a device associated with the first person; and
transmitting the conversation to the device associated with the first person via a text message or email.

9. A system comprising:
one or more processors; and
a non-transitory memory storing instructions that configure the one or more processors to perform operations comprising:
detecting a RFID of a first person in proximity with a device of a second person;
identifying the first person based on identifying features of the first person, the identifying features including a voice of the first person and the RFID of the first person;
retrieving a previous recorded conversation between the second person and the first person in response to the identifying the first person;
identifying a key word within the previous recorded conversation, the identifying the key word based on a frequency of the key word in the previous recorded conversation;
passively recording a conversation between the first person and the second person to a rolling buffer;
identifying the key word in the conversation between the first person and the second person;
recording the conversation to a memory repository in real time in response to identifying the key word; and
sharing the recording of the conversation with the second person.

10. The system of claim 9, wherein the identifying features include one or more facial features, voice data, a radio frequency identifier (RFID), a barcode, or a fingerprint.

11. The system of claim 9, wherein the instructions cause the system to perform operations further comprising:
transmitting the conversation to a third party device controlled by a third party that is separate from both the first person and the second person.

12. The system of claim 8, wherein the device conveys the recordings of the conversations to the first person through transcribing the recording into text.

13. The system of claim 8, wherein the instructions cause the system to perform operations further comprising conveying the conversation to the second person.

14. The system of claim 13, wherein the conveying the conversation to the second person includes:
- transcribing the conversation into text; and
- causing display of the text at the device of the second person.

15. The system of claim 9, wherein the instructions cause the system to perform operations further comprising:
- recalling a past conversation between the first person and the second person in response to the identifying the first person based on the identifying features, the past conversation having occurred previously to the detecting the first person in proximity with the device of the second person; and
- conveying the past conversation to the second person.

16. The system of claim 15, wherein the recalling the past conversation between the first person and the second person includes:
- identifying the past conversation among a set of past conversations based on the identifying the first person and the identifying the key word, wherein the past conversation includes the key word.

17. The system of claim 9, wherein the instructions cause the system to perform operations further comprising sharing the conversation with the first person, and wherein the sharing the conversation includes:
- detecting a device associated with the first person; and
- transmitting the conversation to the device associated with the first person via a text message or email.

18. A non-transitory computer-readable medium embodying instructions that, when executed by a processor, perform operations comprising:
- detecting a RFID of a first person in proximity with a device of a second person;
- identifying the first person based on identifying features of the first person, the identifying features including a voice of the first person and the RFID of the first person;
- retrieving a previous recorded conversation between the second person and the first person in response to the identifying the first person;
- identifying a key word within the previous recorded conversation, the identifying the key word based on a frequency of the key word in the previous recorded conversation;
- passively recording a conversation between the first person and the second person to a rolling buffer;
- identifying the key word in the conversation between the first person and the second person;
- recording the conversation to a memory repository in real time in response to identifying the key word; and
- sharing the recording of the conversation with the second person.

19. The non-transitory computer-readable medium of claim 18, wherein the identifying features include one or more facial features, voice data, a radio frequency identifier (RFID), a barcode, or a fingerprint.

20. The non-transitory computer-readable medium of claim 18, wherein the operations further comprise:
- transmitting the conversation to a third party device controlled by a third party that is separate from both the first person and the second person.

* * * * *